United States Patent
Felton et al.

(10) Patent No.: US 8,250,212 B2
(45) Date of Patent: *Aug. 21, 2012

(54) REQUESTER-SIDE AUTONOMIC GOVERNOR

(75) Inventors: Mitchell D Felton, Rochester, MN (US); Robert A Morgan, Apex, NC (US); Kenneth W Roberson, North Richland Hills, TX (US)

(73) Assignee: International Business Machines Corporation, Armonk, NY (US)

( * ) Notice: Subject to any disclaimer, the term of this patent is extended or adjusted under 35 U.S.C. 154(b) by 622 days.

This patent is subject to a terminal disclaimer.

(21) Appl. No.: 12/136,256

(22) Filed: Jun. 10, 2008

(65) Prior Publication Data

US 2009/0307352 A1 Dec. 10, 2009

(51) Int. Cl.
*G06F 15/173* (2006.01)
*G06F 15/16* (2006.01)

(52) U.S. Cl. ........ 709/226; 709/223; 709/224; 709/219; 709/218; 709/217; 709/201; 709/202; 709/203

(58) Field of Classification Search ........................ None
See application file for complete search history.

(56) References Cited

U.S. PATENT DOCUMENTS

| | | | | |
|---|---|---|---|---|
| 6,188,264 | B1* | 2/2001 | Masuta et al. | 327/316 |
| 6,532,214 | B1* | 3/2003 | Rumsewicz | 370/236 |
| 6,795,864 | B2* | 9/2004 | Connor | 709/232 |
| 6,880,028 | B2* | 4/2005 | Kurth | 710/240 |
| 6,950,885 | B2* | 9/2005 | Shah | 710/36 |
| 6,978,006 | B1* | 12/2005 | Polcyn | 379/265.12 |
| 7,093,141 | B2* | 8/2006 | Elnozahy et al. | 713/300 |
| 7,162,550 | B2* | 1/2007 | Douglas | 710/35 |
| 7,457,872 | B2* | 11/2008 | Aton et al. | 709/224 |
| 7,523,206 | B1* | 4/2009 | Naish et al. | 709/226 |
| 7,631,059 | B2* | 12/2009 | Chang et al. | 709/223 |
| 7,640,453 | B2* | 12/2009 | Li et al. | 714/10 |
| 7,668,981 | B1* | 2/2010 | Nagineni et al. | 710/38 |
| 7,676,791 | B2* | 3/2010 | Hamby et al. | 717/116 |
| 7,720,063 | B2* | 5/2010 | Maiorana et al. | 370/389 |
| 2004/0100903 | A1* | 5/2004 | Han et al. | 370/230 |

(Continued)

OTHER PUBLICATIONS

Jason Bell, "Understand the autonomic manager concept," available through the IBM developerWorks web site, Feb. 17, 2004 and updated Oct. 21, 2004. {http://www.ibm.com/developerworks/autonomic/library/ac-amconcept/}.

(Continued)

*Primary Examiner* — Thu Nguyen
*Assistant Examiner* — Angela Widhalm
(74) *Attorney, Agent, or Firm* — Matthew J. Bussan

(57) ABSTRACT

A requester-side autonomic governor is provided for a requester configured to send service requests to a service provider. For example, the requester and service provider may be disposed in a Service Oriented Architecture (SOA) architected system. A feedback loop, preferably a monitor portion of a Monitor, Analyze, Plan, and Execute (MAPE) loop, is configured to monitor responses to service requests. An autonomic governor mechanism limits the type and/or number of concurrent service requests according to a resource pool scheme, and dynamically adjusts a resource threshold of the resource pool scheme based on information provided by the feedback loop. In one embodiment, the resource threshold is reduced if more than a predetermined number of service requests generated time-outs, and is increased if more than a predetermined number of service requests are being held awaiting available pool resources and less than a predetermined number of service requests generated time-outs.

13 Claims, 6 Drawing Sheets

U.S. PATENT DOCUMENTS

| | | | |
|---|---|---|---|
| 2004/0111506 A1* | 6/2004 | Kundu et al. | 709/223 |
| 2006/0092837 A1* | 5/2006 | Kwan et al. | 370/229 |
| 2006/0171523 A1* | 8/2006 | Greenwell | 379/242 |
| 2006/0173984 A1 | 8/2006 | Emeis et al. | |
| 2006/0179425 A1* | 8/2006 | Scougall et al. | 717/140 |
| 2006/0224424 A1 | 10/2006 | Khusial et al. | |
| 2006/0293967 A1 | 12/2006 | Deluca et al. | |
| 2007/0016573 A1 | 1/2007 | Nanavati et al. | |
| 2007/0016824 A1* | 1/2007 | Bivens et al. | 714/6 |
| 2007/0083875 A1 | 4/2007 | Jennings | |
| 2007/0118652 A1 | 5/2007 | Diedrich et al. | |
| 2007/0192706 A1 | 8/2007 | Bruce et al. | |
| 2008/0019388 A1* | 1/2008 | Harmon et al. | 370/412 |
| 2008/0022257 A1 | 1/2008 | Baartman et al. | |
| 2008/0162664 A1* | 7/2008 | Jegadeesan | 709/217 |
| 2008/0247320 A1* | 10/2008 | Grah et al. | 370/241 |
| 2008/0250419 A1* | 10/2008 | Kasten et al. | 718/104 |
| 2009/0122701 A1* | 5/2009 | Goldman et al. | 370/232 |
| 2009/0259752 A1* | 10/2009 | McNutt et al. | 709/225 |

OTHER PUBLICATIONS

Brad Topel et al., "Automating problem determination: A first step toward self-healing computer systems," available through the IBM developerWorks web site, Oct. 2003. {http://www.ibm.com/developerworks/autonomic/library/ac-summary/ac-prob.html}.

R. Cutlip et al., "Autonomic computing: strengthening manageability for SOA implementations," White Paper, IBM Corporation, Dec. 2006. {http://www-03.ibm.com/autonomic/pdfs/AC_SOA_EB.pdf}.

L. Stojanovic et al., "The role of ontologies in autonomic computing systems," IBM Systems Journal, vol. 43, No. 3, pp. 598-616 (2004).

J.W. Strickland, et al., "Governor: Autonomic Throttling for Aggressive Idle Resource Scavenging," IEEE, 2nd International Conference on Autonomic Computing, Seattle, Washington (Jun. 2005). {httpp://www.ornl.gov/~webworks/cppr/y2001/pres/123436.pdf}.

* cited by examiner

REQUESTER-SIDE AUTONOMIC GOVERNOR

CROSS-REFERENCE TO RELATED APPLICATION

This patent application is related to pending U.S. patent application Ser. No. 12/136,291, filed concurrently, entitled "REQUESTER-SIDE AUTONOMIC GOVERNOR METHOD", which is assigned to the assignee of the instant application.

BACKGROUND OF THE INVENTION

1. Field of Invention

The present invention relates in general to the digital data processing field and, more particularly, to a computer-implemented method, apparatus, and computer program product for implementing a requester-side autonomic governor in a Service Oriented Architecture (SOA) architected system.

2. Background Art

In the latter half of the twentieth century, there began a phenomenon known as the information revolution. While the information revolution is a historical development broader in scope than any one event or machine, no single device has come to represent the information revolution more than the digital electronic computer. The development of computer systems has surely been a revolution. Each year, computer systems grow faster, store more data, and provide more applications to their users.

Years ago, computers where stand-alone devices that did not communicate with each other, but today, computers are increasingly connected in networks and one computer, called a client, may request another computer, called a server, to perform an operation. With the advent of the global Internet, this client/server model is increasingly being used in online businesses and services, such as online commerce, banking, auction houses, stock trading, and information storage and retrieval. The client/server model is also used in local intranets.

Two current techniques for connecting clients and servers are called Service Oriented Architecture (SOA) and Utility Computing. A service-oriented architecture includes a collection of services, which communicate with each other. Typically, a service is a function that is well-defined, self-contained, and does not depend on the context or state of other services. The communication between the services may involve either simple data passing between two or more services, or may involve two or more services coordinating some activity.

Utility computing is a service provisioning model in which a service provider makes computing resources available to a customer as needed, and charges customers for a specific usage of the resource rather than a flat rate. Like other types of on-demand computing (such as grid computing), the utility model seeks to maximize the efficient use of resources and/or minimize associated costs. Another version of utility computing is carried out within an enterprise in a shared pool utility model. In the shared pool utility model, an enterprise centralizes its computing resources to serve a larger number of users without unnecessary redundancy.

In both the Service Oriented Architecture and Utility Computing, the client determines the server that is to receive and process a request, and the client may have multiple requests that it sends to multiple servers. Each server processes its received requests and sends responses to the client that originated the request.

An SOA can provide a consistent, re-usable method for integrating any type of information consumer with any business process or information provider. In the SOA, a set of services can be defined that provide application functions. These services can serve as an abstraction layer that hides core system details from clients and provides a simple way to integrate consumers and service providers based upon standardized protocols, such as XML, WSDL, and SOAP.

Service oriented architectures are characterized by the use of service invocations as the basic building block for distributed systems, whether those systems are loosely coupled or tightly coupled. A service invocation is a call for a service to be performed. Examples of service invocations include simple service invocations, such as instructions to get the current time in UTC; or service invocations to, given a metric unit of measure, produce the equivalent English system of measure. Other examples of service invocations include more complex service invocations, such as instructions to, given an item number, produce the quantity of that item which is stocked in a warehouse or retail store; or instructions to, given a list of items and a customer account number, place an order with a retail enterprise for those items on behalf of the referenced customer.

In an SOA, a client can invoke a service within a component to perform an operation and, optionally the client can receive a response. Invoked services can include, for example, business services configured to fulfill the needs of business customers, whether those customers are individual consumers or other businesses. The services can be grouped into various SOA components where each component can specialize in functions such as catalog management, shopping cart management, credit card transaction processing, sales tax computation and the like.

Typically, a provider of a synchronous service in an SOA has a limited amount of resources or requests that it can support at one time. Hence, one or more clients may simultaneously invoke a synchronous service and overwhelm the service provider with too many requests. Often there is no Message Queuing infrastructure in place to manage and/or control these requests. In some cases it is not possible to apply additional resources or modifications to the service provider. For example, the client, while interested in obtaining the service from the provider, may be an unrelated party with respect to the service provider and, hence, have little or no interest in increasing the provider's capacity. Moreover, the service provider may not find it cost effective to apply additional resources or modifications. In effect, the popularity of the service has caused the provider to experience Quality of Service (QOS) issues. These Quality of Service issues will likely impact the clients invoking the service and, perhaps, cascade to clients of those clients.

These Quality of Service issues may lead clients invoking the synchronous service to develop their own functionality similar to that of the service, especially in cases where demand for the service is increasing or is forecast to increase and/or the requesting application is to be rewritten. Typically, however, continued use of the existing service by the requesting application or re-use of the existing service by the rewritten requesting application is preferred because of the cost and delay that must borne in developing the functionality. In some cases, it may not even be possible for the client to develop the functionality.

Therefore, a need exists for an enhanced mechanism for invoking a synchronous service in a Service Oriented Architecture (SOA) architected system.

SUMMARY OF THE INVENTION

According to the preferred embodiments of the present invention, a requester-side autonomic governor is provided for a requester that is configured to send service requests to a service provider. For example, the requester and service provider may be disposed in a Service Oriented Architecture (SOA) architected system. A feedback loop, which is preferably a monitor portion of a Monitor, Analyze, Plan, and Execute (MAPE) loop, is configured to monitor responses to service requests. An autonomic governor mechanism limits the type and/or number of concurrent service requests according to a resource pool scheme, and dynamically adjusts a resource threshold of the resource pool scheme based on information provided by the feedback loop. In one embodiment, the resource threshold is reduced if more than a predetermined number of service requests generated time-outs, and is increased if more than a predetermined number of service requests are being held awaiting available pool resources and less than a predetermined number of service requests generated time-outs. In this or other embodiments, the resource threshold can be increased if the need is there (e.g., more than a predetermined number of service requests are being held awaiting pool resources) and the resource is there as well—for example, a historical behavior of availability/bandwidth (e.g., quick responses and/or a lack of time-outs) has been logged in recent history.

BRIEF DESCRIPTION OF THE DRAWINGS

The preferred exemplary embodiments of the present invention will hereinafter be described in conjunction with the appended drawings, where like designations denote like elements.

DETAILED DESCRIPTION OF THE PREFERRED EMBODIMENTS 1.0 Overview

In accordance with the preferred embodiments of the present invention, a requester-side autonomic governor is provided for a requester that is configured to send service requests to a service provider. For example, the requester and service provider may be disposed in a Service Oriented Architecture (SOA) architected system. A feedback loop, which is preferably a monitor portion of a Monitor, Analyze, Plan, and Execute (MAPE) loop, is configured to monitor responses to service requests. An autonomic governor mechanism limits the type and/or number of concurrent service requests according to a resource pool scheme, and dynamically adjusts a resource threshold of the resource pool scheme based on information provided by the feedback loop. In one embodiment, the resource threshold is reduced if more than a predetermined number of service requests generated time-outs, and is increased if more than a predetermined number of service requests are being held awaiting available pool resources and less than a predetermined number of service requests generated time-outs. In this or other embodiments, the resource threshold can be increased if the need is there (e.g., more than a predetermined number of service requests are being held awaiting pool resources) and the resource is there as well—for example, a historical behavior of availability/bandwidth (e.g., quick responses and/or a lack of time-outs) has been logged in recent history.

2.0 Detailed Description

Figure 1:
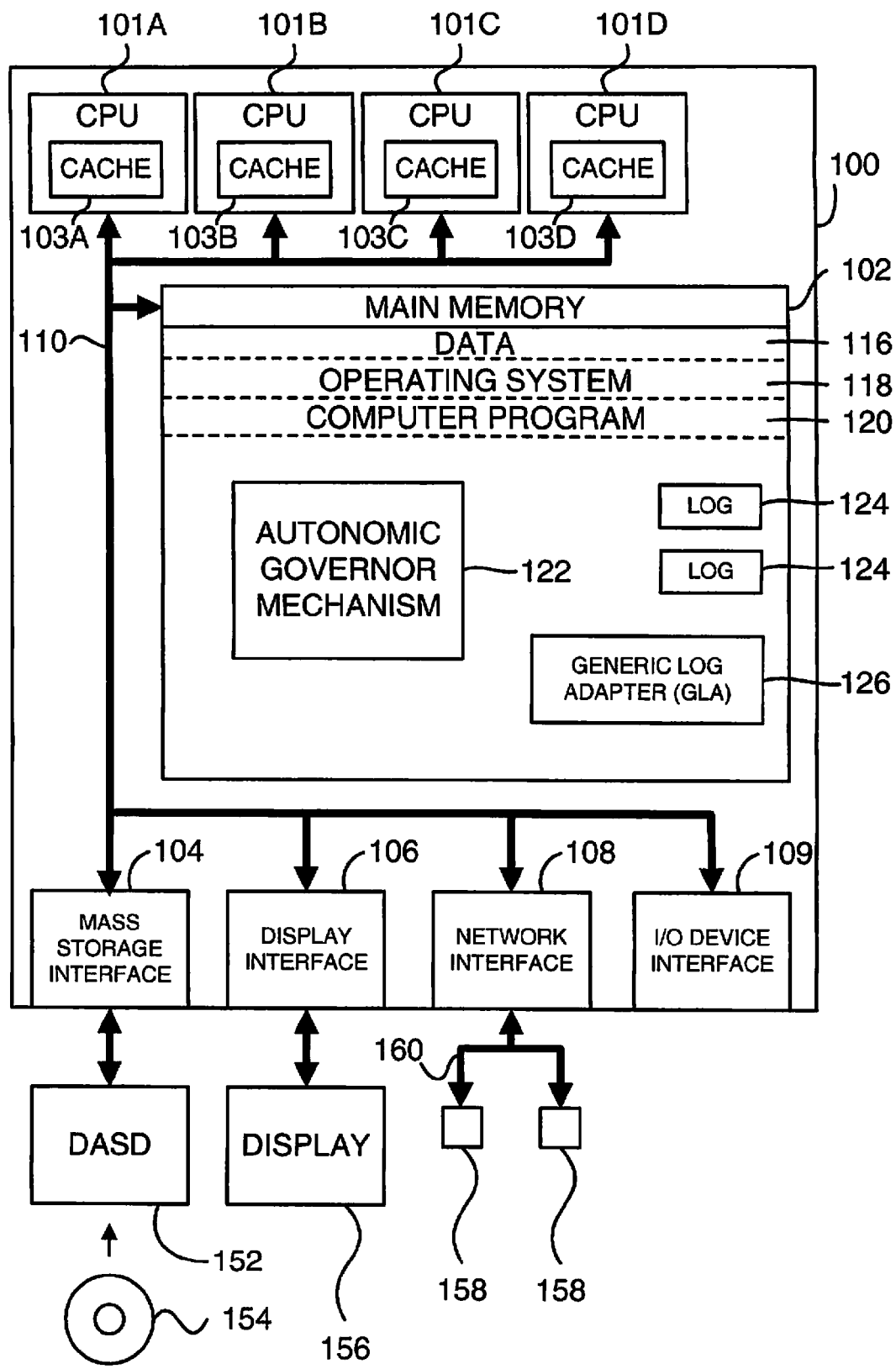
FIG. 1 is a block diagram illustrating a computer apparatus for implementing a requester-side autonomic governor in accordance with the preferred embodiments of the present invention.

A computer system implementation of the preferred embodiments of the present invention will now be described with reference to FIG. 1 in the context of a particular computer system 100, i.e., an IBM eServer iSeries or System i computer system. However, those skilled in the art will appreciate that the method, apparatus, and computer program product of the present invention apply equally to any computer system, regardless of whether the computer system is a complicated multi-user computing apparatus, a single user workstation, a PC, or an embedded control system. As shown in FIG. 1, computer system 100 comprises one or more processors 101A, 101B, 101C and 101D, a main memory 102, a mass storage interface 104, a display interface 106, a network interface 108, and an I/O device interface 109. These system components are interconnected through the use of a system bus 110.

FIG. 1 is intended to depict the representative major components of computer system 100 at a high level, it being understood that individual components may have greater complexity than represented in FIG. 1, and that the number, type and configuration of such components may vary. For example, computer system 100 may contain a different number of processors than shown.

Processors 101A, 101B, 101C and 101D (also collectively referred to herein as "processors 101") process instructions and data from main memory 102. Processors 101 temporarily hold instructions and data in a cache structure for more rapid access. In the embodiment shown in FIG. 1, the cache structure comprises caches 103A, 103B, 103C and 103D (also collectively referred to herein as "caches 103") each associated with a respective one of processors 101A, 101B, 101C and 101D. For example, each of the caches 103 may include a separate internal level one instruction cache (L1 I-cache) and level one data cache (L1 D-cache), and level two cache (L2 cache) closely coupled to a respective one of processors 101. However, it should be understood that the cache structure may be different; that the number of levels and division of function in the cache may vary; and that the system might in fact have no cache at all.

Main memory 102 in accordance with the preferred embodiments contains data 116, an operating system 118 and application software, utilities and other types of software. In addition, main memory 102 includes a computer program 120, an autonomic governor mechanism 122, one or more logs 124, and a Generic Log Adapter (GLA) 126, each of which may in various embodiments exist in any number. The computer program 120 represents any code that performs service calls to a synchronous service (e.g., residing on one or more service provider systems such computer systems 158) accessed remotely (e.g., via the network 160). The autonomic governor mechanism 122 dynamically limits the number and/or type of concurrent invocations of the service. In accordance with the preferred embodiments of the present invention, the autonomic governor mechanism 122 provides autonomic tuning of a resource threshold of a resource pool scheme using a Monitor, Analyze, Plan, and Execute (MAPE) loop.

Although the computer program 120, the autonomic governor mechanism 122, the logs 124 and the generic log adapter 126 are illustrated as being contained within the main memory 102, in other embodiments some or all of them may be on different electronic devices and may be accessed remotely (e.g., via the network 160). Thus, for example, one or more of the logs 124 may be located on a networked device (e.g., the computer system and/or workstation 158), while the computer program 120, the autonomic governor mechanism 122 and the generic log adapter 126 reside on the computer system 100.

In the preferred embodiments of the present invention, the autonomic governor mechanism 122 includes instructions capable of executing on the processors 101 or statements capable of being interpreted by instructions executing on the processors 101 to perform the functions as further described below with reference to FIGS. 3-6. In another embodiment, the autonomic governor mechanism 122 may be implemented in hardware via logic gates and/or other appropriate hardware techniques in lieu of, or in addition to, a processor-based system.

While the autonomic governor mechanism 122 is shown as a separate component in FIG. 1, the preferred embodiments expressly extend to the autonomic governor mechanism 122 being implemented within the operating system 118, the computer program 120, or application software, utilities, or other types of software within the scope of the preferred embodiments.

Computer system 100 utilizes well known virtual addressing mechanisms that allow the programs of computer system 100 to behave as if they have access to a large, single storage entity instead of access to multiple, smaller storage entities such as main memory 102 and DASD device 152. Therefore, while data 116, operating system 118, computer program 120, autonomic governor mechanism 122, logs 124, and generic log adapter 126, are shown to reside in main memory 102, those skilled in the art will recognize that these items are not necessarily all completely contained in main memory 102 at the same time. It should also be noted that the term "memory" is used herein to generically refer to the entire virtual memory of the computer system 100.

Data 116 represents any data that serves as input to or output from any program in computer system 100. Operating system 118 is a multitasking operating system known in the industry as OS/400 or IBM i5/OS; however, those skilled in the art will appreciate that the spirit and scope of the present invention is not limited to any one operating system.

Processors 101 may be constructed from one or more microprocessors and/or integrated circuits. Processors 101 execute program instructions stored in main memory 102. Main memory 102 stores programs and data that may be accessed by processors 101. When computer system 100 starts up, processors 101 initially execute the program instructions that make up operating system 118. Operating system 118 is a sophisticated program that manages the resources of computer system 100. Some of these resources are processors 101, main memory 102, mass storage interface 104, display interface 106, network interface 108, I/O device interface 109 and system bus 110.

Although computer system 100 is shown to contain four processors and a single system bus, those skilled in the art will appreciate that the present invention may be practiced using a computer system that has a different number of processors and/or multiple buses. In addition, the interfaces that are used in the preferred embodiments each include separate, fully programmed microprocessors that are used to off-load compute-intensive processing from processors 101. However, those skilled in the art will appreciate that the present invention applies equally to computer systems that simply use I/O adapters to perform similar functions.

Mass storage interface 104 is used to connect mass storage devices (such as a direct access storage device 152) to computer system 100. One specific type of direct access storage device 152 is a readable and writable CD ROM drive, which may store data to and read data from a CD ROM 154.

Display interface 106 is used to directly connect one or more displays 156 to computer system 100. These displays 156, which may be non-intelligent (i.e., dumb) terminals or fully programmable workstations, are used to allow system administrators and users (also referred to herein as "operators" and "developers") to communicate with computer system 100. Note, however, that while display interface 106 is provided to support communication with one or more displays 156, computer system 100 does not necessarily require a display 156, because all needed interaction with users and processes may occur via network interface 108.

Network interface 108 is used to connect other computer systems and/or workstations 158 to computer system 100 across a network 160. In accordance with the preferred embodiments of the present invention, the computer systems 158 may include one or more service provider systems on which the synchronous service resides, as well as one or more end user systems on which a web browser program resides by which the computer program 120 may be accessed. The present invention applies equally no matter how computer system 100 may be connected to other computer systems and/or workstations, regardless of whether the network connection 160 is made using present-day analog and/or digital techniques or via some networking mechanism of the future. In addition, many different network protocols can be used to implement a network. These protocols are specialized computer programs that allow computers to communicate across network 160. TCP/IP (Transmission Control Protocol/Internet Protocol) is an example of a suitable network protocol.

The I/O device interface 109 provides an interface to any of various input/output devices.

At this point, it is important to note that while this embodiment of the present invention has been and will be described in the context of a fully functional computer system, those skilled in the art will appreciate that the present invention is capable of being distributed as a program product in a variety of forms, and that the present invention applies equally regardless of the particular type of signal bearing media used to actually carry out the distribution. Examples of suitable signal bearing media include: recordable type media such as floppy disks and CD ROMs (e.g., CD ROM 154 of FIG. 1), and transmission type media such as digital and analog communications links (e.g., network 160 in FIG. 1).

Figure 2:
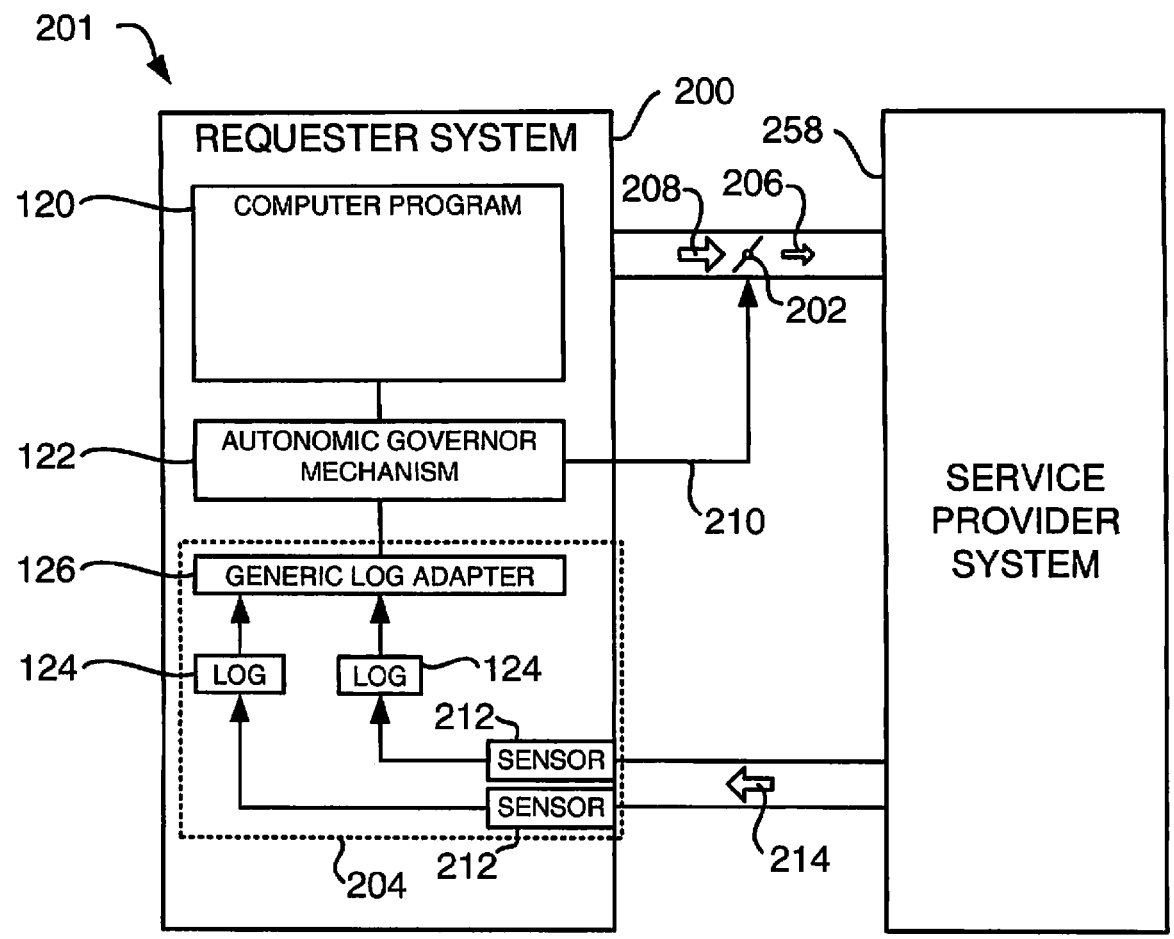
FIG. 2 is a block diagram illustrating a Service Oriented Architecture (SOA) architected system for implementing a requester-side autonomic governor in accordance with the preferred embodiments of the present.

FIG. 2 is a block diagram illustrating a Service Oriented Architecture (SOA) architected system 201 for implementing a requester side autonomic governor in accordance with the preferred embodiments of the present invention. In FIG. 2, the requester system 200 and the service provider system 258 respectively correspond to the computer systems 100 and 158 in FIG. 1. The functions performed by the autonomic governor mechanism 122 are conceptually illustrated in FIG. 2 with a throttle 202 for dynamically limiting concurrent service requests sent by the requester system 200 to the service provider system 258, as well as through a feedback loop 204 by which feedback loop information is provided for controlling the throttle 202. The feedback loop 204 is configured to monitor responses received by the requester system 200 in response to service requests sent to the service provider system 258.

The throttle 202 dynamically limits the number and/or type of concurrent service requests sent by the requester system 200 to the service provider system 258. This feature of dynamically limiting the concurrent service requests sent to the service provider system 258 is conceptually illustrated in FIG. 2 through the reduced size of arrow 206 (representing the "throttled" number and/or type of concurrent service requests) downstream of the throttle 202 relative to size of the arrow 208 (representing the "un-throttled" or "open throttle" number and/or type of concurrent service requests) upstream of the throttle 202. The autonomic governor mechanism 122 uses information provided by the feedback loop 204 to adjust the number and/or type of concurrent service requests sent to the service provider 258. This feature of adjusting the concurrent service requests sent to the service provider system 258 is conceptually shown in FIG. 2 through the autonomic governor mechanism 122 adjusting the throttle 202 using a control line 210.

In accordance with the preferred embodiments of the present invention, the autonomic governor mechanism 122 and the feedback loop 204 together comprise a Monitor, Analyze, Plan, and Execute (MAPE) loop, with the feedback loop 204 comprising the monitor portion of the MAPE loop and the governor mechanism 122 comprising the analyze, plan and execute portion of the MAPE loop. The combination of the autonomic governor mechanism 122 and the feedback loop 204 is also referred to herein as an "autonomic governor".

In accordance with the preferred embodiments of the invention, the feature of dynamically limiting the number and/or type of concurrent service requests sent to the service provider system 258 is accomplished by dynamically adjusting a resource threshold (e.g., the maximum number of concurrent service requests) of a resource pool scheme. In one illustrative example of a number-based resource pool scheme (i.e., based on request quantities), which is described in more detail below with reference to FIG. 6, the amount of available resources in the pool (A=n−x) is determined by subtracting the number of concurrent service requests awaiting response (x) from the maximum number of concurrent service requests (n). In this illustrative example, the maximum number of concurrent requests (n) is the resource threshold of the resource pool scheme. A resource is removed from the pool when a service request is sent to the service provider system (i.e., x is increased by one). If the number of concurrent service requests awaiting response (x) has reached the maximum number (n), then no resource is currently available in the pool (n−x=0) and no additional service request can be sent to the service provider system until resource is available (n−x>0). Resource becomes available in the pool either when a resource is returned to the pool (i.e., upon return of a response to a request, in which case x is decreased by one) or when the maximum number of concurrent service requests (n) is increased (i.e., through the action of the automatic governor mechanism 122).

One skilled in the art will appreciate that other resource pool schemes may be implemented in the context of the present invention in lieu of, or in addition to, the exemplary number-based resource pool scheme briefly described above. For example, a resource pool scheme based one or more parameters other than, or in addition to, the number of requests (e.g., the number/type-based resource pool scheme briefly described below) may be used in accordance with the preferred embodiments of the present invention in lieu of, or in addition to, the exemplary number-based resource pool scheme briefly described above.

Typically, not all service requests have the same impact on the available resources in the pool. In accordance with the preferred embodiments of the present invention, this inequity may be addressed by utilizing a number/type-based resource pool scheme (i.e., based on both request quantities and types). In an illustrative example of a number/type-based resource pool scheme, available resources in the pool are determined utilizing a characteristic parameter for each request. This service request number/type-based resource pool scheme is identical to the number-based resource pool scheme briefly describe above, except that the impact of a given service request on available resources in the pool is discounted with respect to one or more characteristic parameters of the given service request (e.g., the given service request's complexity, size, and the like).

Generally, the terminology "autonomic computing" applies to a system that can monitor itself and adjust to changing demands that the system may encounter. See, for example, Jason Bell, "Understanding the autonomic manager concept", available through the IBM developerWorks web site, Feb. 17, 2004 and updated Oct. 21, 2004. {http://www.ibm.com/developerworks/autonomic/library/ac-amconcept/}.

Hence, a system that includes an autonomic governor in accordance with the preferred embodiments of the present invention is autonomic in the sense that it monitors itself and adjusts to the changing demands put upon it. There are typically four distinct characteristics of an autonomic computing system: self-configuring; self-healing; self-optimizing, and self-protecting. Preferably, a system that includes an autonomic governor in accordance with the preferred embodiments of the present invention provides at least one of those characteristics.

An autonomic computing system generally includes one or more "autonomic managers". These autonomic managers continuously monitor the system and handle events that require action to be taken.

Typically, an autonomic manager has four distinct areas of functionality: monitoring, analyzing, planning, and executing. First, the autonomic manager must monitor the environment using sensor operations and analyze what is found. The autonomic manager then plans and executes any specific actions needed. If, in the planning stage, no action is needed, the autonomic manager returns to the monitoring state. Actions are taken through one or more effector operations. Sensors look at the current state of the managed resources, and effectors have the ability to change the current state. The monitoring, analyzing, planning, and executing functions, taken together, are defined as a control loop. Such a control loop is often referred to as a Monitor, Analyze, Plan, and Execute (MAPE) loop. In accordance with the preferred embodiments of the present invention, the autonomic governor (i.e., the combination of the autonomic governor mechanism 122 and the feedback loop 204) constitute a MAPE loop, in which the feedback loop 204 corresponds with the monitor portion of the MAPE loop and autonomic governor mechanism 122 corresponds with the analyze, plan and execute portion of the MAPE loop.

Alternatively, the autonomic governor mechanism 122 may be implemented as a manual process that involves, for example, utilizing view logs generated in a GLA format to allow for manual adjustment of the resource threshold. For example, the view logs may be displayed on display 156 (shown in FIG. 1) and analyzed by system administrators, who manually apply the view logs to a set of policies (e.g., the exemplary set of policies described below with reference to FIG. 6) to manually tune the resource threshold.

The monitoring, analyzing, planning, and executing functions of an autonomic manager consume and generate knowledge. The knowledge base can be seeded with known information about the system, and can grow as the autonomic manager learns more about the characteristics of the managed resources. For example, in the context of the SOA architected system 201 shown in FIG. 2, a knowledge base of the autonomic governor mechanism 122 may be seeded with known information about the SOA architected system 201 (e.g., an initial value for the resource threshold), and can grow as the autonomic manager learns more about the characteristics of the managed resources (e.g., the resource threshold's initial value is increased or decreased based exceptions that are observed and logged). The knowledge is continuously shared among the monitoring, analyzing, planning and executing functions, leading to better informed decisions being made by each of these functions.

The feedback loop 204 includes one or more sensors 212 for monitoring responses received by the requester system 200 in response to service requests sent by the requester system 200 to the service provider system 258. One of the responses is conceptually illustrated in FIG. 2 as an arrow 214. The feedback loop 204 also includes one or more logs 124 and, preferably, a generic log adapter 126.

Although the response 214 is shown in FIG. 2 as being sent by the service provider system 258, this need not be the case. For example, the service provider system 258 may respond to a service request from the requester system 200 by sending a service request to a third-party service provider system (not shown), which subsequently sends the response to the requester system 200.

The logs 124 contain log information obtained by the one or more sensors 212 through monitoring the responses 214. Preferably, the sensors 212 and the logs 214 are integrated into one or more components of the requester system 200, such as the computer program 120 (shown in FIG. 1), the operating system 118 (shown in FIG. 1), and the network interface 108 (shown in FIG. 1). Typically, each of these individual components produces multiple log files in its own format in various locations. In autonomic computing architectures, it is not uncommon for such disparate logs to be translated into a common format using a generic log adapter. See, for example, Brad Topol et al., "Automating problem determination: A first step toward self-healing computer systems", available through the IBM developerWorks web site, October 2003. {http://www.ibm.com/developerworks/autonomic/library/ac-summary/ac-prob.html}.

In accordance with the preferred embodiments of the present invention, the generic log adapter 126 receives the log information from the logs 124 and translates the log information into a common log format. For example, through the use of the generic log adapter 126 and a generic exception base class (all exceptions thrown by the application may be subclassed off of this base), it is possible to log all exceptions thrown by the application. The generic log adapter 126 may be a separate component as shown in FIG. 2, or may be integrated into autonomic governor mechanism 122 and/or one or more other components of the requester system 200. Alternatively, the generic log adapter 126 may be omitted in favor of using a common log format among the logs 124.

Figure 3:
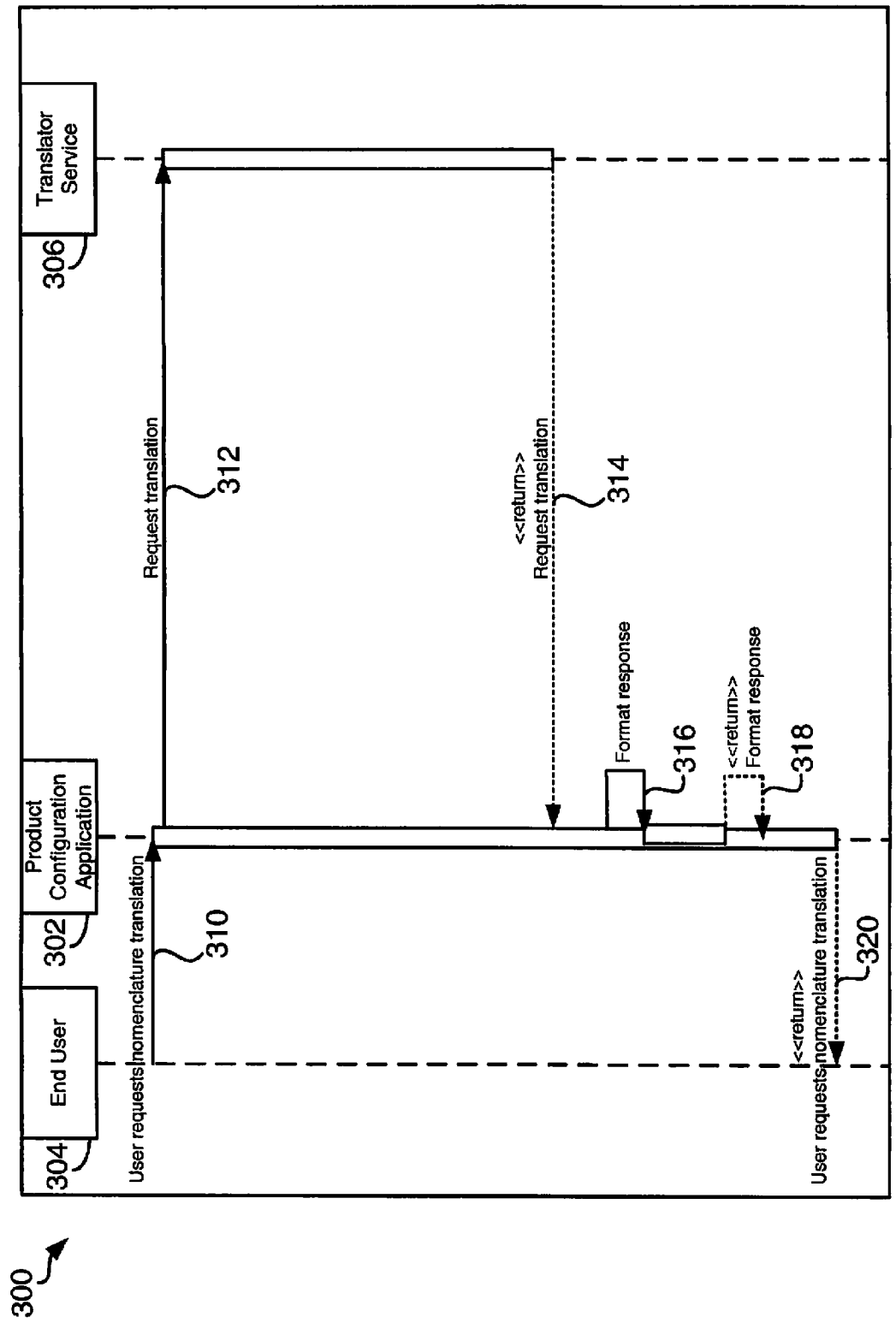
FIG. 3 is a flow diagram illustrating a method in an exemplary Service Oriented Architecture (SOA) environment for implementing a web service call to a synchronous service without a mechanism for limiting workload on the service provider.
Figure 4:
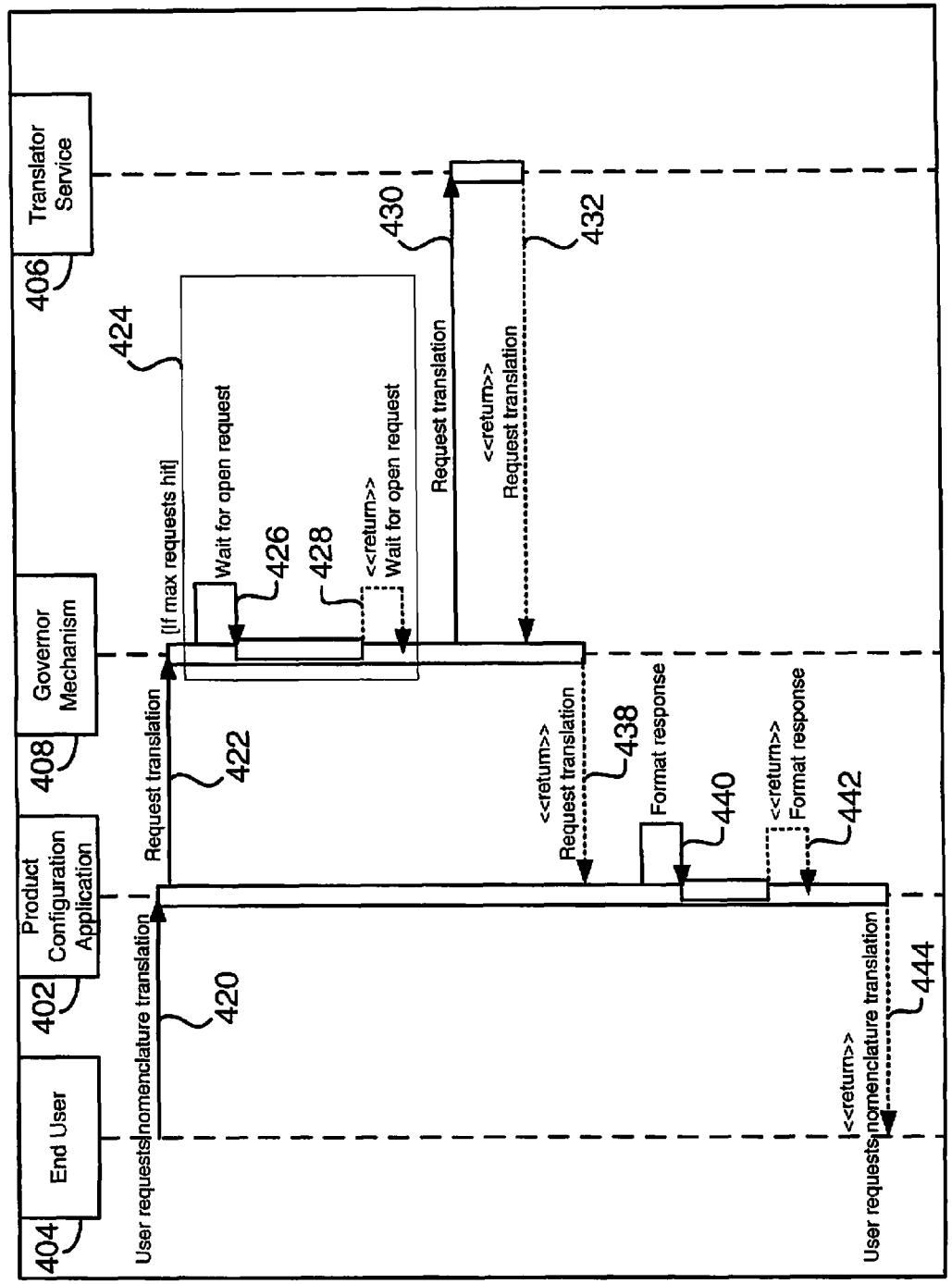
FIG. 4 is a flow diagram illustrating a method in an exemplary Service Oriented Architecture (SOA) environment for implementing a governor mechanism in accordance with the preferred embodiments of the present invention.
Figure 5:
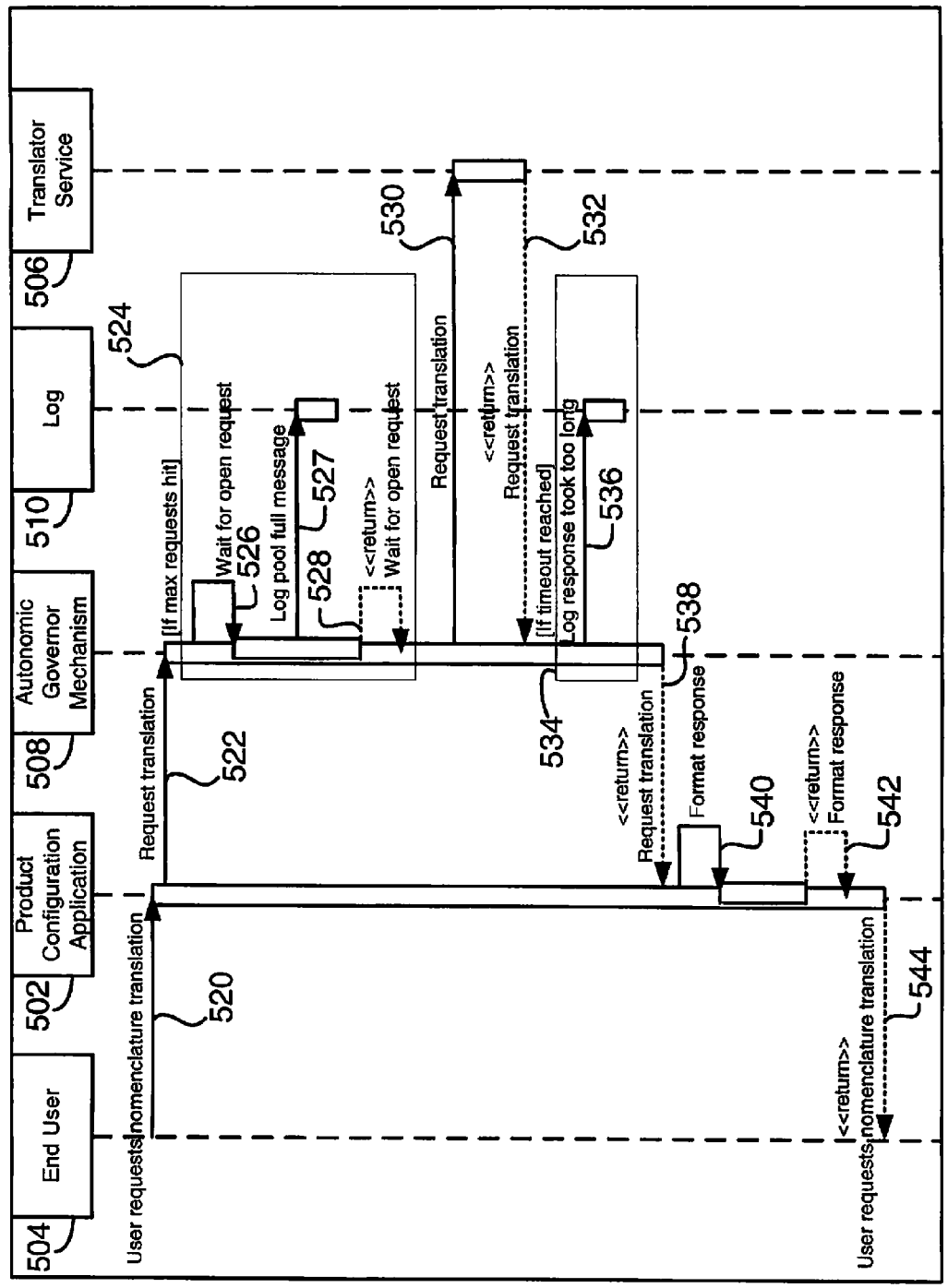
FIG. 5 is a flow diagram illustrating a method in an exemplary Service Oriented Architecture (SOA) environment for implementing an autonomic governor in accordance with the preferred embodiments of the present invention.

For purposes of illustration, FIGS. 3-5 show a particular application, i.e., a web based service call to a synchronous service, to which the invention may be applied. In this particular application, the service call to the synchronous service provides translation between two nomenclatures related to product configuration. One skilled in the art will appreciate that the invention may be used in the context of other applications, both web based and non-web based. Generally, the invention may be used in the context of any application that involves concurrent invocations of a synchronous service.

FIG. 3 is a flow diagram illustrating a method 300 in an exemplary Service Oriented Architecture (SOA) environment for implementing a web service call to a synchronous service without a mechanism for limiting workload on the service provider. The SOA environment shown in FIG. 3 is exemplary. One skilled in the art will appreciate that the invention may be used in the context of other environments, both SOA environments and non-SOA environments.

In the exemplary SOA environment shown in FIG. 3, an SOA architected system includes a product configuration application 302, an end user 304, and a translator service 306. The product configuration application 302 provides product configuration capabilities. For purposes of illustration, the product configuration application 302 is defined herein as a sales tool for configuring products offered by a vendor. These products may include, for example, computer hardware, software, and/or services. The product configuration application 302 may, for example, configure various aspects of a solution (including hardware, software, services, and/or terms and conditions) together.

The product configuration application 302 is accessed by an end user 304. For example, the product configuration application 302 may reside on the computer system 100 (shown in FIG. 1) or requester system 200 (shown in FIG. 2) and may be web based so that one or more end users, such as the end user 304, may access the product configuration application 302 via a web browser program residing on one or more network connected computer systems, such as the computer systems 158 (shown in FIG. 1). Consequently, the product configuration application 302 may be accessed remotely (e.g., via the network 160 shown in FIG. 1) by one or more end users. The end users may include, for example, sales professional employees of the product vendor, other sales professionals (e.g., retail channel), and/or the general public.

As noted above, the invention may be used in the context of any application that involves concurrent invocations of a synchronous service. In the particular application shown in FIG. 3, the concurrent invocations are in the form of service calls to a translator service 306. The translator service 306 may reside on at least one service provider system accessed remotely via at least one network by the product configuration application 302. For example, the translator service 306 may reside on a service provider system that corresponds to the service provider system 258 (shown in FIG. 2) or the computer system 158 (shown in FIG. 1).

In the particular application shown in FIG. 3, the product configuration application 302 invokes translator service 306 to provide translation between two nomenclatures. The translator service 306 is designed to be synchronous in nature. The product configuration application 302, as noted above, is a sales tool for configuring products offered by a vendor. The product configuration application 302 may, for example, configure various aspects of a solution (including hardware, software, services, and/or terms and conditions) together. To perform such a configuration, the product configuration application 302 must have access to translations between the two nomenclatures and thus invokes the translator service 306 to provide nomenclature translation.

In the method 300, the steps discussed below (steps 310-320) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 300 is set forth to show baseline architecture for making a web service call to a synchronous service without a mechanism for limiting workload on the service provider. The method 300 begins with the product configuration application 302 receiving a nomenclature translation request from an end user 304 (step 310). The method 300 continues with the product configuration application 302 sending a request for translation to the translator service 306 (step 312). The request for translation is sent in step 312 without a mechanism for limiting workload on the service provider. Hence, the translator service 306 may be overwhelmed with concurrent service requests from the product configuration application 302 (as well as any additional concurrent service requests from other applications utilizing the translator service 306).

Typically, a provider of a synchronous service (e.g., the translator service 306) in an SOA has a limited amount of resources or requests that it can support at one time. Hence, one or more clients (e.g., the product configuration application 302) may simultaneously invoke a synchronous service (e.g., the translator service 306) and overwhelm the service provider with too many requests. Often there is no Message Queuing infrastructure in place to manage and/or control these requests. In some cases it is not possible to apply additional resources or modifications to the service provider. For example, the client, while interested in obtaining the service from the provider, may be an unrelated party with respect to the service provider and, hence, have little or no interest in increasing the provider's capacity. Moreover, the service provider may not find it cost effective to apply additional resources or modifications. In effect, the popularity of the service has caused the provider to experience Quality of Service (QOS) issues. These Quality of Service issues will likely extend to the clients invoking the service and, perhaps, cascade to clients of those clients (e.g., the end user 304).

The method 300 is susceptible to suffering from these Quality of Service issues because no mechanism is utilized for limiting workload on the service provider. These Quality of Service issues are addressed, at least partially, by a method that utilizes a governor mechanism, such as the method 400 (discussed below with reference to FIG. 4). These Quality of Service issues are better addressed by a method that utilizes an autonomic governor, such as the method 500 (discussed below with reference to FIG. 5).

Returning to now to FIG. 3, the method 300 continues with the translator service 306 returning the request translation to the product configuration application 302 (step 314). In other words, in response to receiving the request for translation from the product configuration application 302 at step 312, the translator service 306 sends the requested translation to the product configuration application 302 at step 314. Because the method 300 does not utilize a mechanism at step 312 for limiting the workload on the translator service 306, the translator service 306 may become overwhelmed with concurrent service requests. As a result, the above-described Quality of Service issues may arise and cascade through the system (e.g., the translator service 306 may be slow to or even fail to complete step 314).

Once the requested translation is received by the product configuration application 302, the method 300 continues with the product configuration application 302 formatting a response. In this regard, the product configuration application 302 issues a "format response" command (step 316) and when the response formatting is complete the product configuration application 302 returns (step 318). Then, the method 300 terminates with the product configuration application 302 returning the response to the nomenclature translation request to the end user 304 (step 320). In other words, in response to receiving the nomenclature translation request from the end user 304 at step 310, the product configuration application 302 sends the response to the end user 304 at step 320.

FIG. 4 is a flow diagram illustrating a method 400 in an exemplary Service Oriented Architecture (SOA) environment for implementing a governor mechanism in accordance with the preferred embodiments of the present invention. The SOA environment shown in FIG. 4 is a modified version of the SOA environment shown in FIG. 3. The SOA environment shown in FIG. 4 is exemplary. One skilled in the art will appreciate that the invention may be used in the context of other environments, both SOA environments and non-SOA environments.

In the exemplary SOA environment shown in FIG. 4, an SOA architected system includes a product configuration application 402, an end user 404, a translator service 406, and a governor mechanism 408. The product configuration application 402 provides product configuration capabilities. For purposes of illustration, the product configuration application 402 is defined herein as a sales tool for configuring products offered by a vendor. These products may include, for example, computer hardware, software, and/or services. The product configuration application 402 may, for example, configure various aspects of a solution (including hardware, software, services, and/or terms and conditions) together.

The product configuration application 402 is accessed by an end user 404. For example, the product configuration application 402 may reside on the computer system 100 (shown in FIG. 1) or requester system 200 (shown in FIG. 2) and may be web based so that one or more end users, such as the end user 404, may access the product configuration application 402 via a web browser program residing on one or more network connected computer systems, such as the computer systems 158 (shown in FIG. 1). Consequently, the product configuration application 402 may be accessed remotely (e.g., via the network 160 shown in FIG. 1) by one or more end users. The end users may include, for example, sales professional employees of the product vendor, other sales professionals (e.g., retail channel), and/or the general public.

As noted above, the invention may be used in the context of any application that involves concurrent invocations of a synchronous service. In the particular application shown in FIG. 4, the concurrent invocations are in the form of service calls to a translator service 406. The translator service 406 may reside on at least one service provider system accessed remotely via at least one network by the requester system. For example, the translator service 406 may reside on a service provider system that corresponds to the service provider system 258 (shown in FIG. 2) or the computer system 158 (shown in FIG. 1).

The translator service 406 is designed to be synchronous in nature. The product configuration application 402, as noted above, is a sales tool for configuring products offered by a vendor. The product configuration application 402 may, for example, configure various aspects of a solution (including hardware, software, services, and/or terms and conditions) together. To perform such a configuration, the product configuration application 402 must have access to translations between the two nomenclatures. In accordance with the preferred embodiments of the present invention, the translator service 406 is invoked not by the product configuration application 402 directly, but through a governor mechanism 408.

The governor mechanism 408 works in conjunction with the product configuration application 402 to limit workload on the translator service 406. The governor mechanism 408 may reside, along with the product configuration application 402, on the computer system 100 (shown in FIG. 1) or requester system 200 (shown in FIG. 2).

In the particular application shown in FIG. 4, it is the governor mechanism 408 that invokes the translator service 406 to provide translation between two nomenclatures. In effect, the governor mechanism 408 acts as a gate keeper between the product configuration application 402 and the translator service 406 with respect to invoking the translator service 406. The governor mechanism 408 allows only a certain number and/or type of concurrent requests to be active at any time. In accordance with the preferred embodiments of the invention, the feature of limiting the number and/or type of concurrent service requests sent to the translator service 406 is accomplished through the use of a resource pool scheme. In one illustrative example of such a resource pool scheme, which is described in more detail below with reference to FIG. 6, the availability of resources in the pool may be based on a fixed maximum number of concurrent service requests. The pool may be bounded, for example, by a properties file setting.

In the method 400, the steps discussed below (steps 420-444) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 400 begins with the product configuration application 402 receiving a nomenclature translation request from an end user 404 (step 420). The method 400 continues with the product configuration application 402 sending a request for translation to the governor mechanism 408 (step 422).

The method 400 then continues with the governor mechanism 408 determining whether the maximum number of concurrent service requests has been reached, i.e., the pool has no available resources (step 424). If the maximum number of concurrent service requests has been reached, the governor mechanism 408 issues a "wait for an open request" command (step 426). The governor mechanism 408 waits for resources to become available (i.e., the governor mechanism 408 waits for resources to be returned to the pool). For example, if no more resources are available, then the requesting thread may wait on the resource. Threads can later be restarted (i.e., notified) when resources become available. Once resources become available, the governor mechanism 408 returns (step 428).

Only after the governor mechanism 408 returns at step 428, or if it was determined at step 424 that the maximum number of concurrent service requests had not been reached, does the governor mechanism 408 send a request for translation to the translator service 406 (step 430). Thus, the method 400, through this action of the governor mechanism 408, significantly reduces the likelihood that the translator service 406 will be overwhelmed by concurrent service requests. Hence, the method 400 addresses, at least partially, the Quality of Service issues suffered by the method 300.

The method 400 then continues with the translator service 406 returning the requested translation to the governor mechanism 408 (step 432). In other words, in response to receiving the request for translation from the governor mechanism 408 at step 430, the translator service 406 sends the requested translation to the governor mechanism 408 at step 432. The method 400 continues with the governor mechanism 408 returning the requested translation to the product configuration application 402 (step 438). In other words, in response to receiving the request for translation from the product configuration application 402 at step 422, the governor mechanism 408 sends the requested translation to the product configuration application 402 at step 438.

Once the requested translation is received by the product configuration application 402 at step 438, the method 400 continues with the product configuration application 402 formatting a response. In this regard, the product configuration application 402 issues a "format response" command (step 440) and when the response formatting is complete the product configuration application 402 returns (step 442). Then, the method 400 terminates with the product configuration application 402 returning the response to the end user 404 (step 444). In other words, in response to receiving the nomenclature translation request from the end user 404 at step 420, the product configuration application 402 sends the response to the end user 404 at step 444.

As mentioned above, the method 400 addresses, at least partially, the Quality of Service issues suffered by the method 300. However, as discussed below, the method 400 suffers its own drawbacks. For instance, as the number of end users (e.g., the end user 404) increases, the number of available resources diminishes per end user. In other words, increasing the number of end users causes each end user's slice of the resource pool pie to become smaller. This puts artificial limits on the end users—these limits may cause problems when the end users have a spike of invocations to make. These drawbacks suffered by the method 400 may be addressed by intelligently "throttling" the number and/or type of concurrent requests sent to the translator service based on a feedback loop. Such an enhanced method, which utilizes an autonomic governor, is described below with reference to FIG. 5.

FIG. 5 is a flow diagram illustrating a method 500 in an exemplary Service Oriented Architecture (SOA) environment for implementing an autonomic governor in accordance with the preferred embodiments of the present invention. The SOA environment shown in FIG. 5 is a modified version of the SOA environment shown in FIGS. 3 and 4. Again, the SOA environment shown in FIG. 5 is exemplary. One skilled in the art will appreciate that the invention may be used in the context of other environments, both SOA environments and non-SOA environments.

In the exemplary SOA environment shown in FIG. 5, an SOA architected system includes a product configuration application 502, an end user 504, a translator service 506, an autonomic governor mechanism 508, and a log 510. The product configuration application 502 provides product configuration capabilities. For purposes of illustration, the product configuration application 502 is defined herein as a sales tool for configuring products offered by a vendor. These products may include, for example, computer hardware, software, and/or services. The product configuration application 502 may, for example, configure various aspects of a solution (including hardware, software, services, and/or terms and conditions) together.

The product configuration application 502 is accessed by an end user 504. For example, the product configuration application 502 may reside on the computer system 100 (shown in FIG. 1) or requester system 200 (shown in FIG. 2) and may be web based so that one or more end users, such as the end user 504, may access the product configuration application 502 via a web browser program residing on one or more network connected computer systems, such as the computer systems 158 (shown in FIG. 1). Consequently, the product configuration application 502 may be accessed remotely (e.g., via the network 160 shown in FIG. 1) by one or more end users. The end users may include, for example, sales professional employees of the product vendor, other sales professionals (e.g., retail channel), and/or the general public.

As noted above, the invention may be used in the context of any application that involves concurrent invocations of a synchronous service. In the particular application shown in FIG. 5, the concurrent invocations are in the form of service calls to a translator service 506. The translator service 506 may reside on at least one service provider system accessed remotely via at least one network by the requester system. For example, the translator service 506 may reside on a service provider system that corresponds to the service provider system 258 (shown in FIG. 2) or the computer system 158 (shown in FIG. 1).

The translator service 506 is designed to be synchronous in nature. The product configuration application 502, as noted above, is a sales tool for configuring products offered by a vendor. The product configuration application 502 may, for example, configure various aspects of a solution (including hardware, software, services, and/or terms and conditions) together. To perform such a configuration, the product configuration application 502 must have access to translations between the two nomenclatures. In accordance with the preferred embodiments of the present invention, the translator service 506 is invoked to provide the nomenclature translation not by the product configuration application 502 directly, but through an autonomic governor mechanism 508.

The autonomic governor mechanism 508 works in conjunction with the product configuration application 502 and at least one log 510 to dynamically limit workload on the translator service 506. The autonomic governor mechanism 508 and the log(s) 510 may reside, along with the product configuration application 502, on the computer system 100 (shown in FIG. 1) or requester system 200 (shown in FIG. 2). The autonomic governor mechanism 508 shown in FIG. 5 corresponds with the autonomic governor mechanism 122 shown in FIGS. 1 and 2. The log(s) 510 shown in FIG. 5 correspond(s) with the log(s) 124 and/or the generic log adapter 126 shown in FIGS. 1 and 2.

Figure 6:
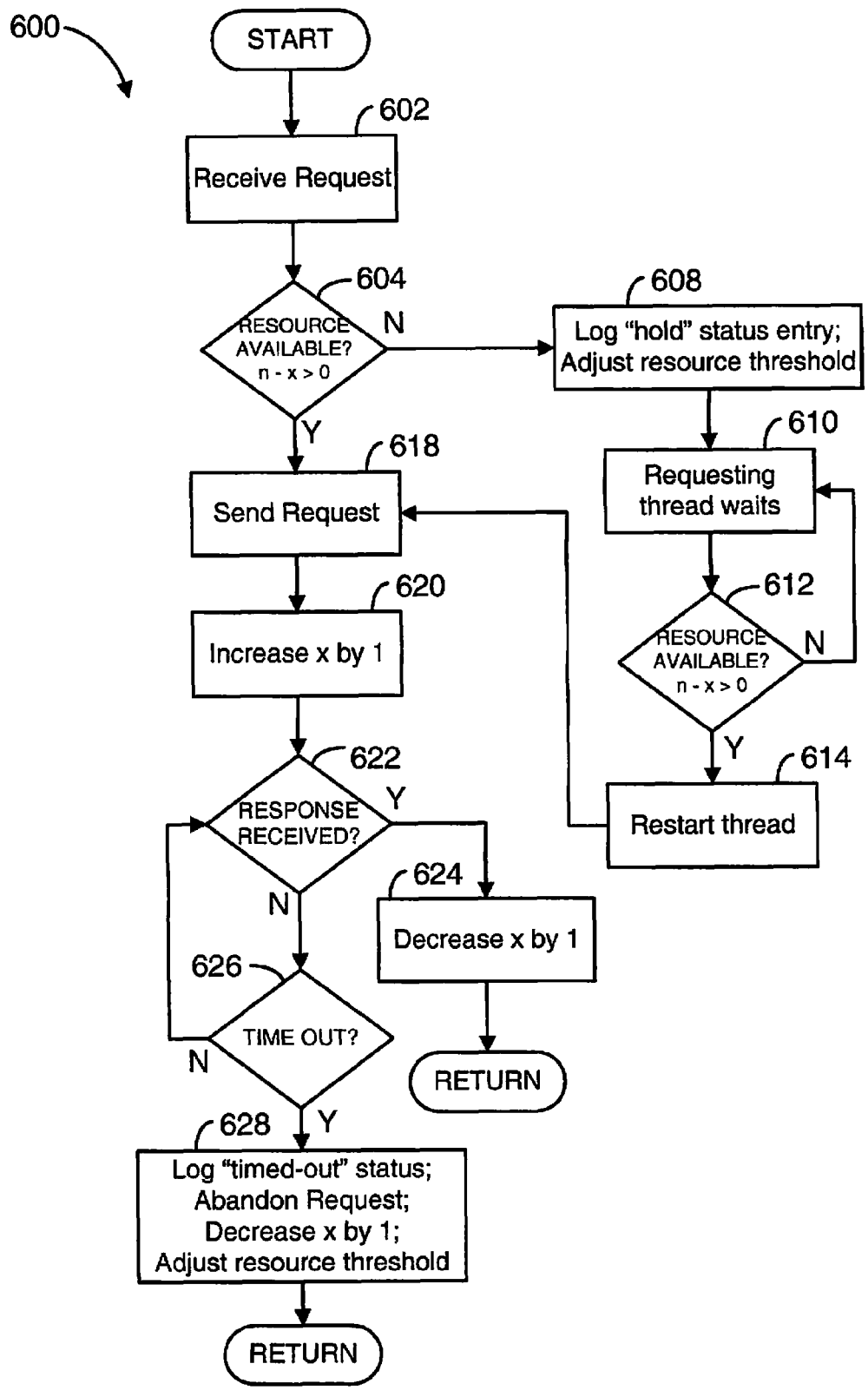
FIG. 6 is a flow diagram illustrating an exemplary resource pool scheme in accordance with the preferred embodiments of the present invention

In the particular application shown in FIG. 5, it is the autonomic governor mechanism 508 that invokes the translator service 506 to provide translation between two nomenclatures. In effect, the autonomic governor mechanism 508 acts as an intelligent gate keeper between the product configuration application 502 and the translator service 506 with respect to invoking the translator service 506. The autonomic governor mechanism 508 allows only an intelligently "throttled" number and/or type of concurrent requests to be active at any time. In accordance with the preferred embodiments of the invention, the feature of intelligently "throttling" the number and/or type of concurrent service requests sent to the translator service 506 is accomplished through the use of a resource pool scheme and a MAPE loop. In one illustrative example of such a resource pool scheme, which is described in more detail below with reference to FIG. 6, availability of resources in the pool is based on an intelligently-adjusted maximum number of concurrent service requests (i.e., resources in the pool). The maximum number of concurrent service requests utilized in the resource pool scheme shown in FIG. 6 is controlled (i.e., increased/decreased) based on feedback information (e.g., logged exceptions such as a "hold" status and/or a "timed-out" status) obtained using the MAPE loop.

In the method 500, the steps discussed below (steps 520-544) are performed. These steps are set forth in their preferred order. It must be understood, however, that the various steps may occur at different times relative to one another than shown, or may occur simultaneously. Moreover, those skilled in the art will appreciate that one or more of the steps may be omitted. The method 500 begins with the product configuration application 502 receiving a nomenclature translation request from an end user 504 (step 520). The method 500 continues with the product configuration application 502 sending a request for translation to the autonomic governor mechanism 508 (step 522).

The method 500 then continues with the autonomic governor mechanism 508 determining whether the maximum number of concurrent service requests has been reached, i.e., the pool has no available resources (step 524). If the maximum number of concurrent service requests has been reached, the autonomic governor mechanism 508 issues a "wait for an open request" command (step 526). The autonomic governor mechanism 508 waits for resources to become available (i.e., the autonomic governor mechanism 508 waits for resources to be returned to the pool and/or for the maximum number of concurrent service requests to be increased). For example, if no more resources are available, then the requesting thread may wait on the resource. Threads can later be restarted (i.e., notified) when resources become available. In addition, the autonomic governor mechanism 508 causes the logging of a "hold" status entry in the log 510 (step 527). In addition, once the "hold" status entry is logged, the autonomic governor mechanism 508 may adjust the resource threshold according to a set of policies, such as the exemplary set of policies discussed below with reference to FIG. 6. Once resources become available, the autonomic governor mechanism 508 returns (step 528).

Only after the autonomic governor mechanism 508 returns at step 528, or if it was determined at step 524 that the maximum number of concurrent service requests had not been reached, does the autonomic governor mechanism 508 send a request for translation to the translator service 506 (step 530). Thus, the method 500, through this action of the autonomic governor mechanism 508, significantly reduces the likelihood that the translator service 506 will be overwhelmed by concurrent service requests. Hence, the method 500 addresses the Quality of Service issues discussed above with respect to the method 300. Moreover, because the autonomic governor mechanism 508 utilizes feedback information (e.g., the number logged exceptions, such as "holds" and "timed-outs") provided by the feedback loop to adjust the resource threshold, the method 500 reduces the drawbacks discussed above with respect to the method 400 related to its fixed limit.

The method 500 then continues with the translator service 506 returning the requested translation to the autonomic governor mechanism 508 (step 532). In other words, in response to receiving the request for translation from the autonomic governor mechanism 508 at step 530, the translator service 506 sends the requested translation to the autonomic governor mechanism 508 at step 532. The autonomic governor mechanism 508 also determines whether or not a time out has been reached with no response (step 534), i.e., the autonomic governor mechanism 508 determines whether the requested translation has not been returned from by the translator service 506 within a predetermined amount of time. If the autonomic governor mechanism 508 determines that a time out has been reached without a response at step 534, the method 500 continues with the autonomic governor mechanism 508 causing a "timed-out" status entry to be logged in the log 510 (step 536), and the request is abandoned. In addition, once the "timed-out" status entry is logged, the autonomic governor mechanism 508 may adjust the resource threshold according to a set of policies, such as the exemplary set of policies discussed below with reference to FIG. 6.

On the other hand, if the requested translation has been returned from the translator service at step 532 within the predetermined amount of time (i.e., no time out), the method 500 continues with the autonomic governor mechanism 508 returning the requested translation to the product configuration application 502 (step 538). In other words, in response to receiving the request for translation from the product configuration application 502 at step 522, the autonomic governor mechanism 508 sends the requested translation to the product configuration application 502 at step 538.

Once the requested translation is received by the product configuration application 502 at step 538, the method 500 continues with the product configuration application 502 formatting a response. In this regard, the product configuration application 502 issues a "format response" command (step 540) and when the response formatting is complete the product configuration application 502 returns (step 542). Then, the method 500 terminates with the product configuration application 502 returning the response to the end user 504 (step 544). In other words, in response to receiving the nomenclature translation request from the end user 504 at step 520, the product configuration application 502 sends the response to the end user 504 at step 544.

FIG. 6 is a flow diagram illustrating an exemplary resource pool scheme 600 in accordance with preferred embodiments of the present invention. The resource pool scheme 600 shown in FIG. 6 is a number-based resource pool scheme (i.e., based on request quantities). The number of resources available in the pool is given by the following equation.

$$A = n - x$$

A=number of resources available in the pool
n=maximum number of concurrent service requests (resource threshold)
x=number of concurrent service requests awaiting response If the number of concurrent service requests awaiting response (x) has reached the maximum number (n), then no resource is currently available in the pool (A=0) and no additional service request can be sent to the service provider system until resource is available (A>0). Resource becomes available either when a resource is returned to the pool (i.e., the number of concurrent service requests (x) is reduced because a response to a request was received) or when the maximum number of concurrent service requests (n) is increased (i.e., via action of the autonomic governor mechanism).

One skilled in the art will appreciate that other resource pool schemes may be implemented in the context of the present invention in lieu of, or in addition to, a number-based resource pool scheme. For example, the number/type-based resource pool scheme, briefly described earlier, may be used in accordance with the preferred embodiments of the present invention in lieu of, or in addition to, the resource pool scheme 600.

In the resource pool scheme 600, the steps discussed below (steps 602-628) are performed. These steps are set forth in their preferred order. It must be understood, however, that the various steps may occur at different times relative to one another than shown, or may occur simultaneously. Moreover, those skilled in the art will appreciate that one or more of the steps may be omitted. For example, the logging steps (i.e., steps 608 and 628) may be omitted if the governor mechanism 408 (shown in FIG. 4) is used in lieu of the autonomic governor mechanism 508 (shown in FIG. 5). The resource pool scheme 600 begins with the autonomic governor mechanism receiving a request (step 602). The resource pool scheme 600 continues with the autonomic governor mechanism determining whether resource is available (step 604). This is accomplished by determining if n−x>0.

If resource is not available at step 604 (step 604=N), then a "hold" status entry is logged by the autonomic governor mechanism (step 608). The logging of this exception corresponds to step 527 in FIG. 5. In addition, after logging the "hold" status entry, the autonomic governor mechanism may adjust the reference threshold according to a set of policies, such as the exemplary set of policies set forth below. Then the requesting thread will wait on the resource (step 610). After a predetermined amount of time, the autonomic governor mechanism again determines whether resource is available (step 612). If resource still is not available at step 612 (step 612=N), the resource pool scheme 600 returns to step 610. On the other hand, if resource is available at step 612 (step 612=Y), the resource pool scheme 600 continues with the autonomic governor mechanism notifying the requesting thread to restart (step 614). The resource pool scheme 600 then continues with the autonomic governor mechanism sending the request (step 618).

If resource is available at step 604 (step 604=Y), the resource pool scheme 600 then continues with the autonomic governor mechanism sending the request (step 618).

Upon sending the request at step 618, the autonomic governor mechanism also increases the number of concurrent service requests awaiting response (x) by one (step 620) and determines whether a response to the request has been received (step 622). If a response has been received (step 622=Y), then the resource pool scheme 600 continues with the autonomic governor mechanism decreasing the number of concurrent service requests awaiting response (x) by one (step 624). The resource pool scheme 600 then returns.

On the other hand, if a response has not been received (step 622=N), then the resource pool scheme 600 continues with the autonomic governor mechanism determining if a time out has occurred (step 626). A time out is declared if a response has not been received within a predetermined amount of time since the request was sent. If a time out has occurred (step 626=Y), then a "timed-out" status is logged by the autonomic governor mechanism, the request is abandoned, and the number of concurrent service requests awaiting response (x) is decreased by one (step 628). The logging of this exception corresponds to step 536 in FIG. 5. In addition, after logging the "hold" status entry, the autonomic governor mechanism may adjust the reference threshold according to a set of policies, such as the exemplary set of policies set forth below. The resource pool scheme 600 then returns. On the other hand, if a time out has not occurred (step 626=N), then the resource pool scheme returns to step 622.

In accordance with the preferred embodiments of the present invention, the autonomic governor mechanism utilizes the exception log entries (e.g., "hold" and "timed-out") to tune the resource threshold for calling the translator service. As mentioned above, a set of policies are utilized to tune the resource threshold based on the exception log entries. These policies dictate the autonomic governor mechanism's dynamic adjustment of the resource threshold to thereby decrease or increase the number and/or type of concurrent service requests.

An exemplary set of policies follows:

If more than a predetermined number (e.g., >3) of "timed-out" log entries are detected, then Reduce the resource threshold by an incremental amount (e.g., −2%) to restrict the request flow to the service provider If the resource threshold is at a minimum size, notify a support person to investigate if the service provider is offline or some other network related issue is present.

If more than a predetermined number (e.g., >1) of "hold" log entries are detected and less than a predetermined number (e.g., <2) of "timed-out" log entries are detected, then increase the resource threshold by an incremental amount (e.g., +2%) to increase the request flow to the service provider.

The above set of policies is set forth as an illustrative example. Other policy sets may be used in accordance with the preferred embodiments of the present invention. For example, the response times of the calls to the service can be monitored by the MAPE loop. The response times may be logged into more granular categories than merely the "timed-out" status entry (e.g., quick response, normal response, and slow response) and integrated into an enhanced set of policies to react to smaller changes in system conditions. For example, if a shift in the population distribution of response times from "normal" to "slow" is detected, the enhanced set of polices would dictate that the autonomic governor mechanism reduce the resource threshold by an incremental amount to restrict the request flow to the service provider. This enhancement may prevent the occurrence of a time-out that might otherwise occur under the exemplary set of policies above.

In addition, the MAPE loop may also be used to construct a peak history of one or more measures indicative of a constrained resource. For example, the "hold" and "timed-out" log entries may be saved over a period of time and the analyzed to recognize patterns. If such patterns are observed, then the autonomic governor mechanism may apply floating windows during which time the resource threshold is increased or decreased based on the peak history (time-of-day, day-of-week, day-of-month, and the like).

One or more service request characteristic parameters may also be integrated into an enhanced set of policies. These service request characteristic parameters include, for example, the complexity and/or the size of each particular service request. It may be desirable to correlate these service request characteristic parameters with their respective response times. For example, if it is determined that sending a complex and/or large service request is likely to result in the occurrence of a time out after increasing the request flow in accordance with the exemplary set of policies above, it may be desirable to modify the exemplary set of policies above to prohibit increasing the request flow when a complex and/or large service request is to be sent.

One skilled in the art will appreciate that many variations are possible within the scope of the present invention. Thus, while the present invention has been particularly shown and described with reference to the preferred embodiments thereof, it will be understood by those skilled in the art that changes in form and detail may be made therein without departing from the spirit and scope of the present invention.

What is claimed is:

1. An apparatus configured to send service requests to a service provider system, the apparatus comprising:

at least one processor;

a memory coupled to the at least one processor;

a feedback loop configured to monitor responses to service requests sent by the apparatus to a service provider system;

an autonomic governor mechanism residing in the memory and executed by the at least one processor, the autonomic governor mechanism limiting at least one of the type and number of concurrent service requests active at any time according to a resource pool scheme, wherein the autonomic governor mechanism dynamically adjusts a resource threshold of the resource pool scheme based on information provided by the feedback loop;

wherein the autonomic governor mechanism dynamically adjusts the resource threshold based on a timed-out status and a hold status, wherein the timed-out status occurs when a response time is more than a predetermined amount of time, the response time being a duration of time between when a given service request is sent to the service provider system by the apparatus and when a response to the given service request is received by the apparatus, and wherein the hold status occurs if a given service request is not sent to the service provider system, at least temporarily, but rather is held in the apparatus awaiting available pool resources;

wherein the autonomic governor mechanism reduces the resource threshold if the timed-out status occurs with respect to more than a predetermined number of service requests, and wherein the autonomic governor mechanism increases the resource threshold if the hold status occurs with respect to more than a predetermined number of service requests and the timed-out status occurs with respect to less than a predetermined number of service requests.

2. The apparatus as recited in claim 1, wherein the apparatus and the service provider system are disposed in a Service Oriented Architecture (SOA) architected system.

3. The apparatus as recited in claim 1, wherein the feedback loop and the autonomic governor mechanism together comprise a Monitor, Analyze, Plan, and Execute (MAPE) loop, wherein the feedback loop comprises a monitor portion of the MAPE loop, and wherein the autonomic governor mechanism comprises an analyze, plan and execute portion of the MAPE loop.

4. The apparatus as recited in claim 1, further comprising:

a Generic Log Adapter (GLA) configured to receive log information from one or more logs available to the apparatus and translate the log information into a common log format.

5. The apparatus as recited in claim 1, wherein the autonomic governor mechanism dynamically adjusts the resource threshold based on a service request characteristic parameter, wherein the service request characteristic parameter is based on at least one of complexity and size of a given service request.

6. The apparatus as recited in claim 1, wherein the information provided by the feedback loop is used to construct a peak history of one or more measures indicative of a constrained resource, and wherein the autonomic governor mechanism dynamically adjusts the resource threshold based on the peak history.

7. An apparatus configured to send service requests to a service provider, the apparatus comprising:
  at least one processor;
  a memory coupled to the at least one processor;
  an autonomic governor mechanism residing in the memory and executed by the at least one processor, the autonomic governor mechanism limiting at least one of the type and number of concurrent service requests active at any time according to a resource pool scheme, and dynamically adjusting a resource threshold of the resource pool scheme based on information provided by a feedback loop configured to monitor responses to service requests sent by the apparatus to the service provider;
  wherein the autonomic governor mechanism dynamically adjusts the resource threshold based on a timed-out status and a hold status, wherein the timed-out status occurs when a response time is more than a predetermined amount of time, the response time being a duration of time between when a given service request is sent to the service provider by the apparatus and when a response to the given service request is received by the apparatus, and wherein the hold status occurs if a given service request is not sent to the service provider, at least temporarily, but rather is held in the apparatus awaiting available pool resources;
  wherein the autonomic governor mechanism reduces the resource threshold if the timed-out status occurs with respect to more than a predetermined number of service requests, and wherein the autonomic governing mechanism increases the resource threshold if the hold status occurs with respect to more than a predetermined number of service requests and the timed-out status occurs with respect to less than a predetermined number of service requests.

8. The apparatus as recited in claim 7, wherein the autonomic govern mechanism dynamically adjusts the resource threshold based on a combination of the response time and a service request characteristic parameter, the service request characteristic parameter being based on at least one of complexity and size of a given service request.

9. The apparatus as recited in claim 7, wherein the autonomic governor mechanism sends a notification if the resource threshold is reduced below a minimum size.

10. The apparatus as recited in claim 7, wherein the information provided by the feedback loop is used to construct a peak history of one or more measures indicative of a constrained resource, and wherein the autonomic governor mechanism dynamically adjusts the resource threshold based on the peak history.

11. A computer program product for implementing a requester-side autonomic governor in a digital computing device configured to send service requests to a service provider, the computer program product comprising:
  a plurality of instructions provided on a signal-bearing media comprising recordable media, wherein the instructions when executed by at least one processor of the digital computing device, cause the digital computing device to perform the steps of:
    limiting at least one of the type and number of concurrent service requests active at any time according to a resource pool scheme;
    dynamically adjusting a resource threshold of the resource pool scheme based on information provided by a feedback loop configured to monitor responses to service requests sent by the digital computing device to the service provider;
    wherein the information provided by the feedback loop comprises a timed-out status and a hold status, wherein the timed-out status occurs when a response time is more than a predetermined amount of time, the response time being a duration of time between when a given service request is sent to the service provider by the digital computing device and when a response to the given service request is received by the digital computing device, and wherein the hold status occurs if a given service request is not sent to the service provider, at least temporarily, but rather is held in the apparatus awaiting available pool resources;
    wherein the step of dynamically adjusting the resource threshold based on the information provided by the feedback loop comprises the steps of:
      reducing the resource threshold if the timed-out status occurs with respect to more than a predetermined number of service requests;
      increasing the resource threshold if the hold status occurs with respect to more than a predetermined number of service requests and the timed-out status occurs with respect to less than a predetermined number of service requests.

12. The computer program product as recited in claim 11, wherein the information provided by the feedback loop comprises a service request characteristic parameter, wherein the service request characteristic parameter is based on at least one of complexity and size of a given service request.

13. The computer program product as recited in claim 11, wherein the step of dynamically adjusting the resource threshold based on the information provided by the feedback loop comprises the steps of:
  providing a peak history by logging over a period of time one or more measures indicative of a constrained resource based on the information provided by the feedback loop;
  dynamically adjusting the resource threshold based on the peak history.

* * * * *